US012796832B2

(12) United States Patent
Tang

(10) Patent No.: US 12,796,832 B2
(45) Date of Patent: Nov. 17, 2026

(54) FOLDING BABY SLEEPING BASKET

(71) Applicant: KUNSHAN VIGORKIDS CHILD PRODUCTS CO., LTD., Kunshan (CN)

(72) Inventor: Weihong Tang, Kunshan (CN)

(73) Assignee: KUNSHAN VIGORKIDS CHILD PRODUCTS CO., LTD., Kunshan (CN)

( * ) Notice: Subject to any disclaimer, the term of this patent is extended or adjusted under 35 U.S.C. 154(b) by 0 days.

(21) Appl. No.: 19/080,575

(22) Filed: Mar. 14, 2025

(65) Prior Publication Data

US 2026/0069050 A1 Mar. 12, 2026

(30) Foreign Application Priority Data

Sep. 12, 2024 (CN) ......................... 202422232952.8

(51) Int. Cl.
*A47D 9/00* (2006.01)
*B62B 7/08* (2006.01)

(52) U.S. Cl.
CPC ................ *A47D 9/005* (2013.01); *B62B 7/08* (2013.01)

(58) Field of Classification Search
CPC ................................ A47D 9/005; A47D 13/02
USPC ............................................................ 5/99.1
See application file for complete search history.

(56) References Cited

U.S. PATENT DOCUMENTS 5,694,655 A * 12/1997 Shepler .................. A47D 9/005 5/101
2002/0016991 A1* 2/2002 Brown ................. A47D 13/063 5/99.1
2008/0282468 A1 11/2008 Golias et al.

FOREIGN PATENT DOCUMENTS

| | | | | |
|---|---|---|---|---|
| AU | 2025202115 | A1 | | 3/2026 |
| CN | 2757686 | Y | † | 2/2006 |
| CN | 202908317 | | † | 5/2013 |
| CN | 202908317 | U | | 5/2013 |
| CN | 105996587 | A | | 10/2016 |
| CN | 208498578 | | † | 2/2019 |
| CN | 208498578 | U | | 2/2019 |
| CN | 208909496 | | † | 5/2019 |
| CN | 208909496 | U | | 5/2019 |
| CN | 210961210 | | † | 7/2020 |
| CN | 210961210 | U | | 7/2020 |
| CN | 113679206 | A | | 11/2021 |

(Continued)

*Primary Examiner* — David R Hare
*Assistant Examiner* — Joseane E. Tejada
(74) *Attorney, Agent, or Firm* — SZDC Law PC

(57) ABSTRACT

The present disclosure discloses a folding baby sleeping basket, wherein a sleeping basket frame includes an upper surrounding frame formed by rotatingly connecting a front upper surrounding rod and a rear upper surrounding rod, a front lower surrounding rod, a rear lower surrounding rod, front supporting rods, and rear supporting rods; upper ends of the front supporting rods are rotatingly connected with the front upper surrounding rod, upper ends of the rear supporting rods are rotatingly connected with the rear upper surrounding rod, lower ends of the front supporting rods are rotatingly connected with lower ends of the rear supporting rods; rear portions of the front lower surrounding rod are rotatingly connected with lower portions of the front supporting rods, and front portions of the rear lower surrounding rod are rotatingly connected with lower portions of the rear supporting rods.

7 Claims, 5 Drawing Sheets

(56) References Cited

FOREIGN PATENT DOCUMENTS

| | | | | | |
|---|---|---|---|---|---|
| CN | 219556807 | | † | 8/2023 | |
| CN | 219556807 | U | | 8/2023 | |
| CN | 116714658 | A | * | 9/2023 | ............... B62B 7/08 |
| CN | 117508310 | A | | 2/2024 | |
| CN | 118557001 | | † | 8/2024 | |
| CN | 118557001 | A | | 8/2024 | |
| CN | 118877068 | A | | 11/2024 | |
| CN | 118924072 | A | | 11/2024 | |
| CN | 223025734 | U | | 6/2025 | |
| DE | 202025103074 | U1 | | 6/2025 | |
| EP | 4706456 | A1 | | 3/2026 | |

* cited by examiner
† cited by third party

FOLDING BABY SLEEPING BASKET

This application claims priority to Chinese Patent Application No. CN 202422232952.8, filed on Sep. 12, 2024, which is incorporated by reference for all purposes as if fully set forth herein.

TECHNICAL FIELD

The present disclosure relates to a folding baby sleeping basket, and more particularly to a foldable baby sleeping basket.

BACKGROUND OF THE INVENTION

In the prior art, the baby sleeping basket generally includes a sleeping basket frame, and a cloth cover provided on the sleeping basket frame, wherein the sleeping basket frame includes an upper surrounding frame and a sleeping plate provided below the upper surrounding frame for the baby to lie on. Currently, most baby sleeping baskets are folded only in the height direction of the sleeping basket, but not in the length direction. The folded sleeping basket is still large in volume and inconvenient to carry and store.

SUMMARY OF THE INVENTION

An object of the present disclosure is to provide a baby sleeping basket having a novel structure and a reduced volume when folded, thus making it convenient for outdoor carrying and storage.

The technical solution of this disclosure is: a folding baby sleeping basket includes a foldable sleeping basket frame, a cloth cover sleeving the sleeping basket frame, and locking mechanisms for locking the sleeping basket frame in an unfolded state, wherein the sleeping basket frame includes a canopy rod, an upper surrounding frame formed by rotatingly connecting a front upper surrounding rod and a rear upper surrounding rod, a front lower surrounding rod, a rear lower surrounding rod, front supporting rods, and rear supporting rods; the canopy rod is rotatingly connected with the upper surrounding frame; upper ends of the front supporting rods are rotatingly connected with the front upper surrounding rod, upper ends of the rear supporting rods are rotatingly connected with the rear upper surrounding rod, lower ends of the front supporting rods are rotatingly connected with lower ends of the rear supporting rods; rear portions of the front lower surrounding rod are rotatingly connected with lower portions of the front supporting rods, and front portions of the rear lower surrounding rod are rotatingly connected with lower portions of the rear supporting rods; front linkage rods and rear linkage rods are provided between the front upper surrounding rod and the front lower surrounding rod, and between the rear upper surrounding rod and the rear lower surrounding rod, respectively; and when the upper surrounding frame is folded, the front supporting rods and the rear supporting rods are folded accordingly, and the front lower surrounding rod is folded toward the front upper surrounding rod and the rear lower surrounding rod is folded toward the rear upper surrounding rod under the linkage action of the front linkage rods and the rear linkage rods, thereby completing the folding of the whole sleeping basket frame.

As a preferred technical solution, the lower portion of the front supporting rod and the lower portion of the rear supporting rod are bent respectively to form a front flat portion and a rear flat portion; when the sleeping basket frame is in the unfolded state, the front lower surrounding rod, the front flat portions of the front supporting rods, the rear flat portions of the rear supporting rods, and the rear lower surrounding rod are unfolded to form a lower surrounding frame of the sleeping basket frame and the lower surrounding frame is flat placed below the upper surrounding frame.

As a preferred technical solution, a sleeping plate is arranged between bottom portions of the front lower surrounding rod and the rear lower surrounding rod, and the sleeping plate is provided with folds arranged right and left corresponding to rotating connections of the front lower surrounding rod and the front supporting rods, rotating connections of the rear lower surrounding rod and the rear supporting rods, and rotating connections of the front supporting rods and the rear supporting rods, respectively; when the sleeping basket frame is folded, the sleeping plate is folded along the three folds and simultaneously folded with the lower surrounding frame.

As a preferred technical solution, the sleeping basket frame further includes insertion bases mounted at the rotating connections of the rear supporting rods and the rear lower surrounding rod.

As a preferred technical solution, when the sleeping basket frame is in the unfolded state, rotation points between the front linkage rods and the front upper surrounding rod are located behind rotation connection points between the front supporting rods and the front upper surrounding rod, and rotation points between the front linkage rods and the front lower surrounding rod are located behind rotation connection points between the front supporting rods and the front lower surrounding rod; rotation points between the rear linkage rods and the rear upper surrounding rod are located before rotation connection points between the rear supporting rods and the rear upper surrounding rod, and rotation points between the rear linkage rods and the rear lower surrounding rod are located before rotation connection points between the rear supporting rods and the rear lower surrounding rod.

As a preferred technical solution, the locking mechanisms are arranged at rotating connections of the front upper surrounding rod and the rear upper surrounding rod.

As a preferred technical solution, the front or rear upper surrounding rod is provided with an unlocking operation assembly for simultaneously releasing the unfolding locking on the upper surrounding frame by the locking mechanisms on both sides. The unlocking operating assembly is preferably a rotary unlocking handle assembly.

In comparison with the prior art, the present application has the following advantages: the present disclosure has a novel structure, which allows the sleeping basket frame to be folded in both the height direction and the length direction at the same time, so that the folded baby sleeping basket is smaller in volume, and provides great convenience in daily carrying and storage by the user.

BRIEF DESCRIPTION OF DRAWINGS

In order to illustrate the technical solutions of the embodiments of the present disclosure more clearly, the accompanying drawings required for use in the description of the embodiments will be briefly described below. The accompanying drawings in the following description are only some embodiments of the present disclosure, and other drawings can be obtained from these drawings for those of ordinary skill in the art without paying inventive step.

The structures, proportions, sizes, and the like illustrated in drawings in this specification are only for the purpose of complementing the content disclosed in the specification and facilitating understanding and reading by those skilled in the art, not for limiting the implementable conditions of the present disclosure, therefore, there is no technical significance, and any structural modification, proportionality change, or adjustment of the dimensions, without affecting the performance or the objectives of the present disclosure, should still fall within the scope of the technical content disclosed by the disclosure.

Figure 1:
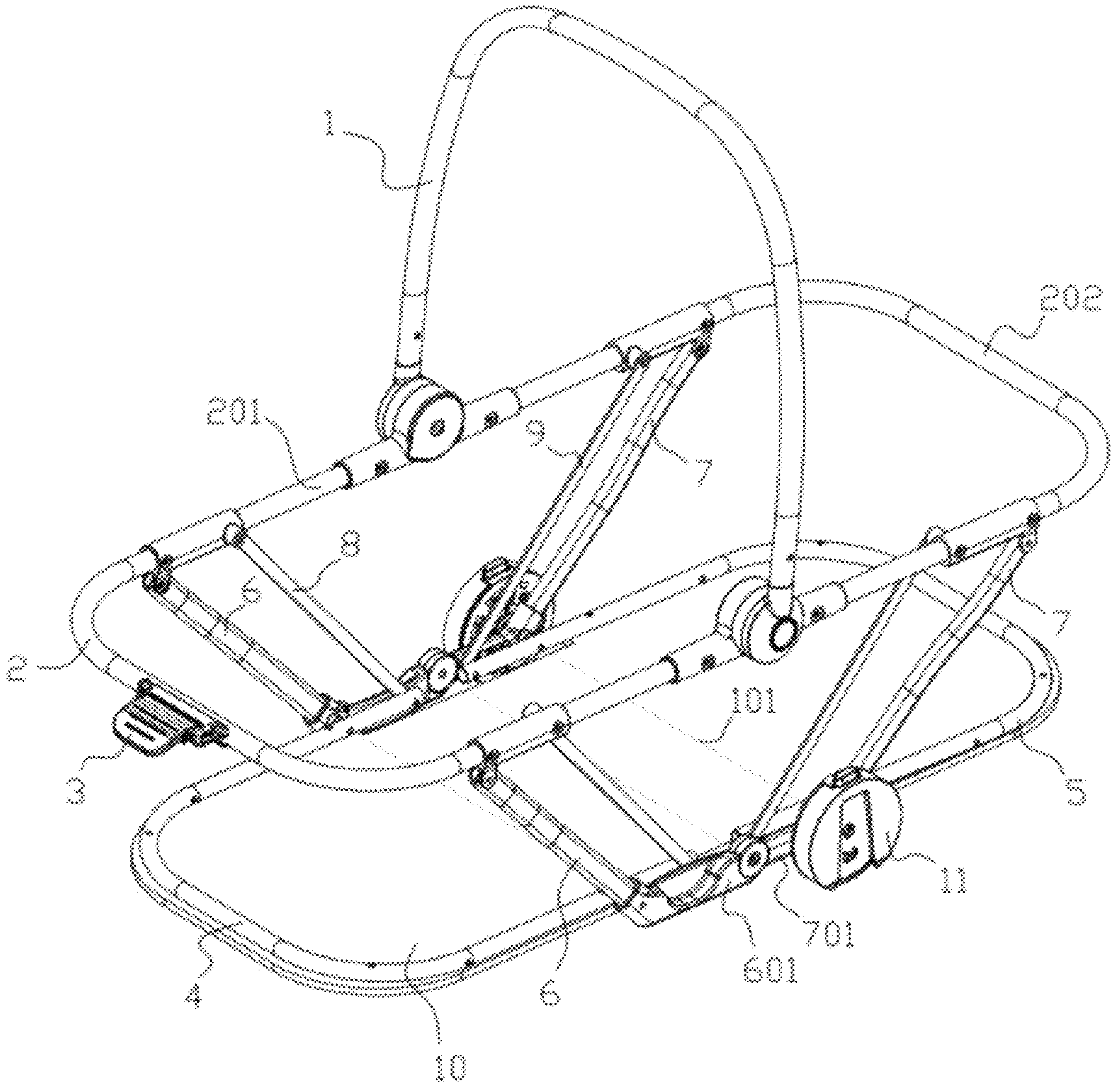
FIG. 1 is a schematic diagram of the three-dimensional structure of the disclosure when it is in an unfolded state.

Wherein: 1 canopy rod;

2 upper surrounding frame; 201 front upper surrounding rod; 202 rear upper surrounding rod;

3 unlocking operation assembly;

4 front lower surrounding rod;

5 rear lower surrounding rod;

6 front supporting rod; 601 front flat portion;

7 rear supporting rod; 701 rear flat portion;

8 front linkage rod;

9 rear linkage rod;

10 sleeping plate; 101 fold; and

11 insertion base.

DETAILED DESCRIPTION OF THE INVENTION

In order to make the objectives, technical solutions and advantages of the present application more clear, the technical solutions of the embodiments of the present application will be clearly and completely described below in conjunction with the accompanying drawings of the embodiments of the present application. Apparently, the described embodiments are a part of the embodiments of the present application, but not all of the embodiments. Based on the described embodiments of the present application, all other embodiments obtained by those of ordinary skill in the art without creative effort, belong to the scope of protection of the present application. It is understood that some technical measures of the various embodiments described herein may be substituted or combined with each other without conflict.

In the description of the present specification and claims, if the terms "first", "second", etc., are present, they are only used to distinguish the described objects and do not have any sequential or technical meaning. Thus, an object defined as "first", "second", etc. may explicitly or implicitly include one or more of the objects. Further, words such as "a" or "an" do not indicate a limitation of the number, but rather indicate that at least one is present, and "a plurality" indicates not less than two.

In the description of the present specification and claims, if there are terms such as "connection", "mounting", "fixing", "contained", etc., they should be understood broadly unless otherwise specified. For example, "connection" may be separate connection or integrated connection, may be direct connection or indirect connection through an intermediate medium, and may be non-detachable connection or detachable connection.

As another example, "contained" does not necessarily mean that the whole is completely contained, and the concept also includes a partially contained case where a portion protrudes externally. For those of ordinary skilled in the art, the specific meanings of the above terms in the present application may be understood according to specific situations.

In the description of the present specification and claims, if the terms "upper", "lower", "horizontal" and the like are present, the orientation or positional relationship indicated is based on the orientation or positional relationship shown in the drawings, and is merely intended to facilitate describing the present application and simplifying the description, rather than to indicate or imply that the referred element has to be located in a specific direction or constructed and operated in the specific direction, these directional terms are relative concepts for purposes of description and clarity relative thereto, which may vary accordingly in accordance with changes in the orientation in which the components are placed in the drawings. For example, if the device in the figures is turned over, elements described as "below" other elements would then be positioned "above" the other elements.

In the description of the present specification and the claims, the term "if" is generally interchangeable with "when" or "upon" or "in response to determining" or "in response to detecting", depending on the context.

In the description of the present specification and claims, when it comes to the term "in the direction of" with respect to a motion, including a motion with a directional component, the term "in the direction of" is not necessarily understood to mean a motion in only one direction, and those skilled in the art can understand the specific meaning of the aforementioned term in the present application according to specific circumstances.

Figure 2:
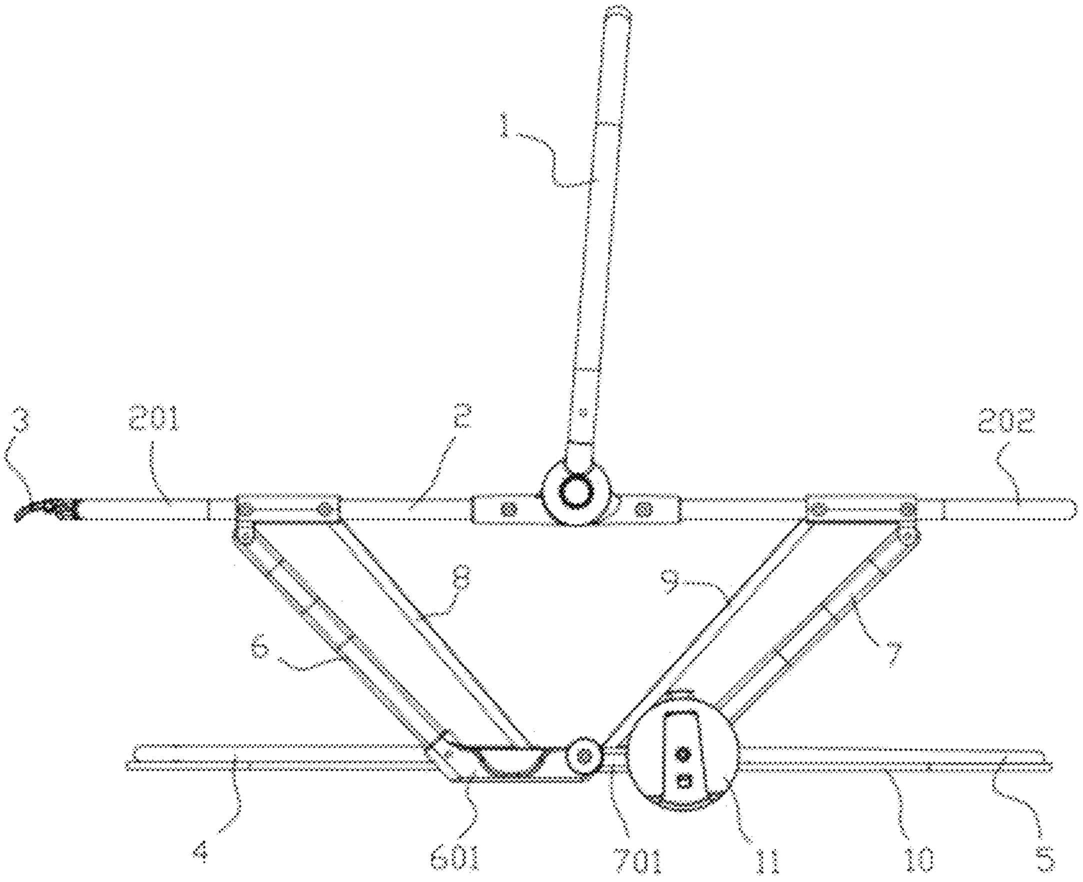
FIG. 2 is a schematic diagram of the side structure of the disclosure when it is in an unfolded state (the sleeping board is not drawn)
Figure 3:
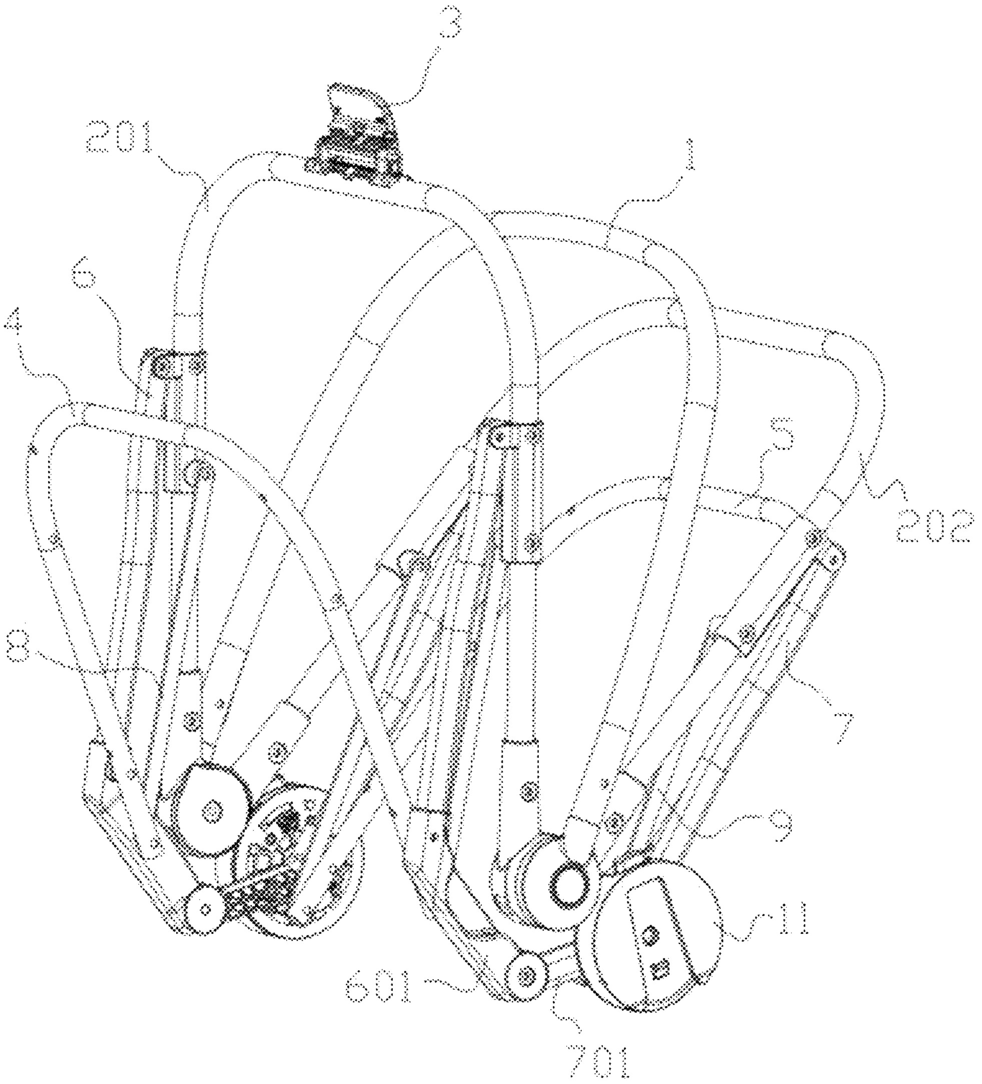
FIG. 3 is a schematic diagram of the three-dimensional structure of the disclosure when it is in a folding process (the sleeping board is not drawn)
Figure 4:
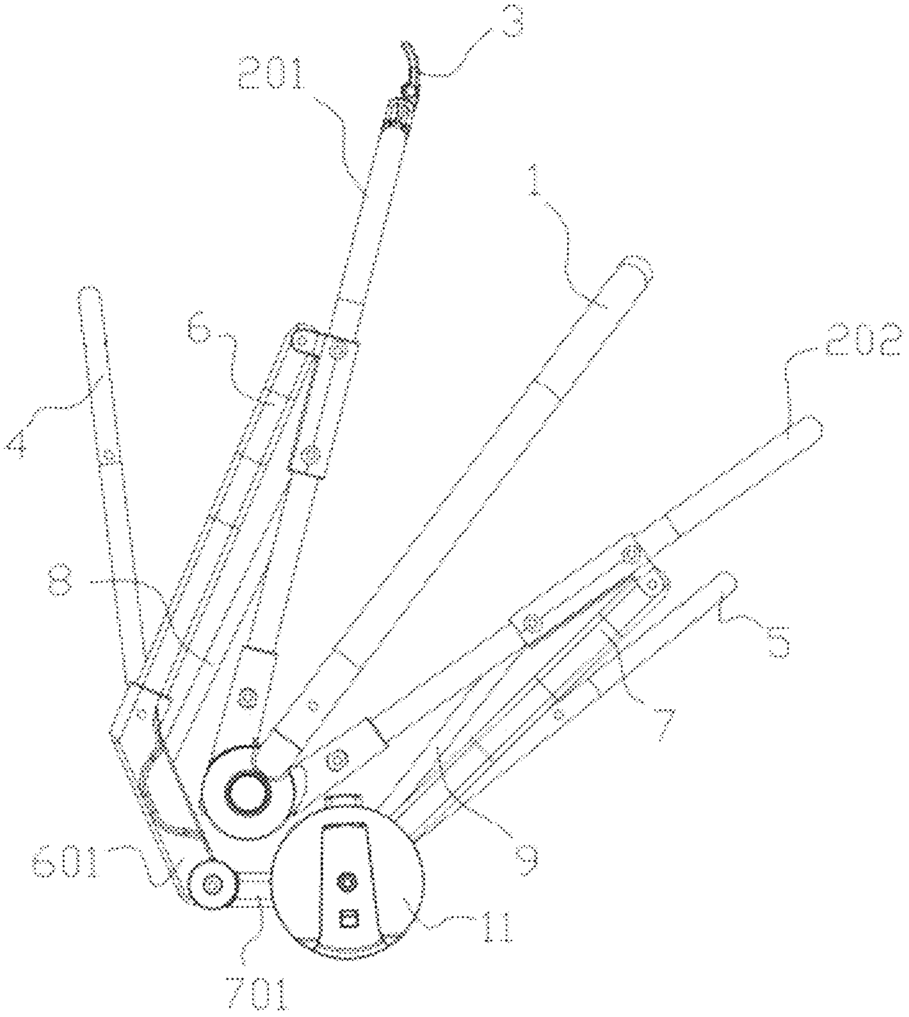
FIG. 4 is a schematic diagram of the side structure of the disclosure when it is in a folding process (the sleeping board is not drawn)
Figure 5:
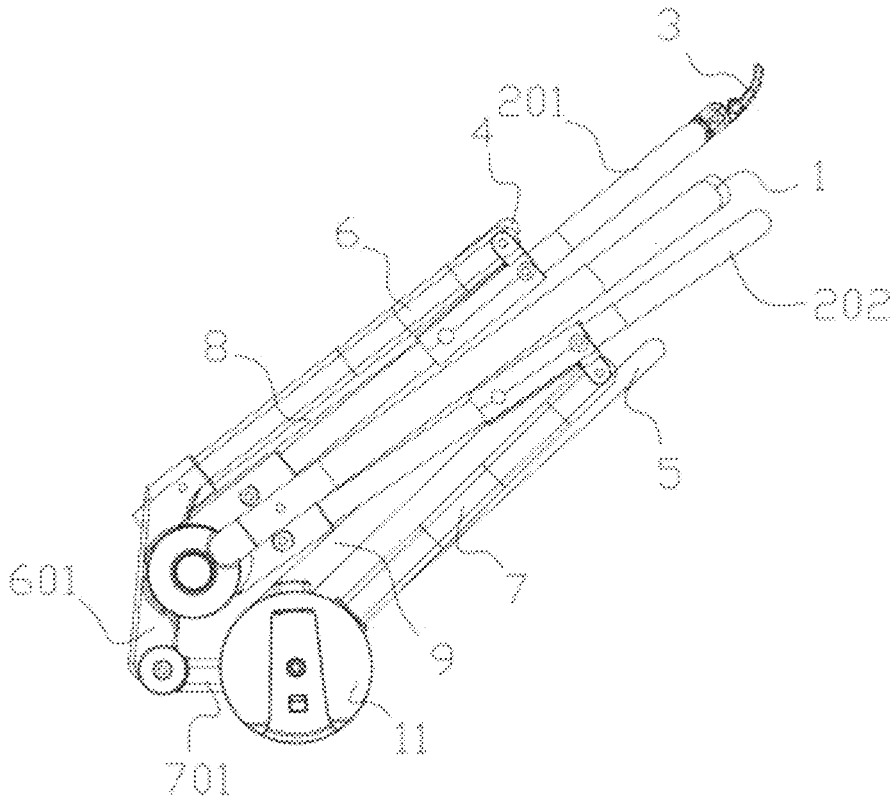
FIG. 5 is a schematic diagram of the side structure of the disclosure when it is in a folded state (the sleeping board is not drawn).

As shown in FIGS. 1-5, a folding baby sleeping basket includes a foldable sleeping basket stand, a cloth cover sleeving the sleeping basket frame, and locking mechanisms for locking the sleeping basket frame in an unfolded state, wherein the sleeping basket frame includes a canopy rod 1, an upper surrounding frame 2, a front lower surrounding rod 4, a rear lower surrounding rod 5, front supporting rods 6, and rear supporting rods 7; the canopy rod 1 is rotatingly connected with the upper surrounding frame 2;

the upper surrounding frame 2 includes a front upper surrounding rod 201 and a rear upper surrounding rod 202, and a rear end of the front upper surrounding rod 201 and a front end of the rear upper surrounding rod 202 are rotatingly connected;

upper ends of the front supporting rods 6 are rotatingly connected with the front upper surrounding rod 201, upper ends of the rear supporting rods 7 are rotatingly connected with the rear upper surrounding rod 202, lower ends of the front supporting rods 6 are rotatingly connected with lower ends of the rear supporting rods 7;

rear portions of the front lower surrounding rod 4 are rotatingly connected with lower portions of the front supporting rods 6, and front portions of the rear lower surrounding rod 5 are rotatingly connected with lower portions of the rear supporting rods 7; and front linkage rods 8 and rear linkage rods 9 are provided between the front upper surrounding rod 201 and the front lower surrounding rod 4, and between the rear upper surrounding rod 202 and the rear lower surrounding rod 5, respectively.

In the embodiment, the canopy rod 1 can be rotatingly connected with rotating connections of the front upper surrounding rod 201 and the rear upper surrounding rod 202, can be rotatingly connected with the front upper surrounding rod 201, and can be rotatingly connected with the rear upper surrounding rod 202.

In the embodiment, the lower portion of the front supporting rod 6 and the lower portion of the rear supporting rod 7 are bent respectively to form a front flat portion 601 and a rear flat portion 701; when the sleeping basket frame is in the unfolded state, the front lower surrounding rod 4, the front flat portions 601 of the front supporting rods 6, the rear flat portions 701 of the rear supporting rods 7, and the rear lower surrounding rod 5 are unfolded to form a lower surrounding frame of the sleeping basket frame and the lower surrounding frame is flat placed below the upper surrounding frame 2.

In the embodiment, a sleeping plate 10 is arranged between bottom portions of the front lower surrounding rod 4 and the rear lower surrounding rod 5, and the sleeping plate 10 is provided with folds 101 arranged right and left corresponding to rotating connections of the front lower surrounding rod 4 and the front supporting rods 6, rotating connections of the rear lower surrounding rod 5 and the rear supporting rods 7, and rotating connections of the front supporting rods 6 and the rear supporting rods 7, respectively; when the sleeping basket frame is folded, the sleeping plate 10 is folded along the three folds 101 and simultaneously folded with the lower surrounding frame.

In the embodiment, the sleeping basket frame further includes insertion bases 11, in the diagram of the embodiment, the insertion bases 11 are mounted at the rotating connections of the rear supporting rods 7 and the rear lower surrounding rod 5.

In the embodiment, when the sleeping basket frame is in the unfolded state, rotation points between the front linkage rods 8 and the front upper surrounding rod 201 are located behind rotation connection points between the front supporting rods 6 and the front upper surrounding rod 201, and rotation points between the front linkage rods 8 and the front lower surrounding rod 4 are located behind rotation connection points between the front supporting rods 6 and the front lower surrounding rod 4;

rotation points between the rear linkage rods 9 and the rear upper surrounding rod 202 are located before rotation connection points between the rear supporting rods 7 and the rear upper surrounding rod 202, and rotation points between the rear linkage rods 9 and the rear lower surrounding rod 5 are located before rotation connection points between the rear supporting rods 7 and the rear lower surrounding rod 5.

In the embodiment, the locking mechanisms are arranged at rotating connections of the front upper surrounding rod 201 and the rear upper surrounding rod 202. The front rear upper surrounding rod 201 or rear upper surrounding rod 202 is provided with an unlocking operation assembly 3 for simultaneously releasing the unfolding locking on the upper surrounding frame by the locking mechanisms on both sides. In the embodiment, the unlocking operation assembly 3 is preferably a rotary unlocking handle assembly, and since the unlocking operation assembly 3 is diverse in the technical field, it will not be specifically described and limited.

The working principle of this disclosure is:

when the sleeping basket frame is in the unfolded and used state, the front upper surrounding rod 201 and the rear upper surrounding rod 202 are unfolded and laid flat to form a rectangular upper surrounding frame 2, and the front upper surrounding rod 201 and the rear upper surrounding rod 202 are locked by the locking mechanisms. The front lower surrounding rod 4, the front flat portions 601 of the front supporting rods 6, the rear flat portions 701 of the rear supporting rods 7, and the rear lower surrounding rod 5 are unfolded to form the lower surrounding frame of the sleeping basket frame and the lower surrounding frame is flat placed below the upper surrounding frame 2. The parts of the front supporting rods 6 excluding the front flat portions 601 and the parts of the rear support rods 7 excluding the rear flat portions 701, along with the front linkage rods 8 and the rear linkage rods 9, are inclined and supported between the upper surrounding frame 2 and the lower surrounding frame.

When the sleeping basket frame needs to be folded, the unlocking operation assembly 3 is operated to unlock, and the unlocking operation assembly 3 releases the locking of the front upper surrounding rod 201 and the rear upper surrounding rod 202 by the locking mechanisms through a traction cable. At this point, the front upper surrounding rod 201, the rear upper surrounding rod 202, and the canopy rod 1 are folded. The front upper surrounding rod 201 and the rear upper surrounding rod 202 drive the front supporting rods 6 and the rear supporting rods 7 to fold. Under the linkage action of the first linkage rods 8 and the second linkage rods 9, the front lower surrounding rod 4 is folded towards the front upper surrounding rod 201, and the rear lower surrounding rod 5 is folded towards the rear upper surrounding rod 202, thereby completing the folding of the whole sleeping basket frame.

The present disclosure has a novel structure, which allows the sleeping basket frame to be folded in both the height direction and the length direction at the same time, so that the folded baby sleeping basket is smaller in volume, and provides great convenience in daily carrying and storage by the user.

As a preferred embodiment of the present disclosure, in the description of the present specification, a description with reference to the terms "preferred", "optional", or the like means that a specific feature, structure, material, or characteristic described in connection with the embodiment or example is included in at least one embodiment or example of the present disclosure. In the present specification, schematic expressions of the above terms do not necessarily refer to the same embodiments or examples. Moreover, the specific features, structures, materials, or features described may be combined in a suitable manner in any one or more embodiments or examples.

The above embodiments are only used to illustrate detailed embodiments of the present disclosure, the present disclosure is not limited to the above detailed embodiments, i.e., it is not meant that the present disclosure must be implemented depending on the above detailed embodiments. It will be apparent to those skilled in the art that any modifications to the present disclosure, equivalent substitutions to the various materials of the products of the present disclosure, addition of auxiliary ingredients, selection of specific modes, and the like, fall within the protection scope and disclosed contents of the present disclosure.

The invention claimed is:

1. A folding baby sleeping basket, comprising a foldable sleeping basket frame, a cloth cover sleeving the sleeping basket frame, and a plurality of locking mechanisms for locking the sleeping basket frame in an unfolded state, wherein the sleeping basket frame comprises a canopy rod, an upper surrounding frame formed by rotatingly connecting a front upper surrounding rod and a rear upper surrounding rod, a front lower surrounding rod, a rear lower surrounding rod, front supporting rods, and rear supporting rods; the canopy rod is rotatingly connected with the upper surrounding frame; an upper end of the front supporting rods are rotatingly connected with the front upper surrounding rod, an upper end of the rear supporting rods are rotatingly connected with the rear upper surrounding rod, lower ends of the front supporting rods are rotatingly connected with lower ends of the rear supporting rods; rear portions of the front lower surrounding rod are rotatingly connected with lower portions of the front supporting rods, and a front portion of the rear lower surrounding rod are rotatingly connected with lower portions of the rear supporting rods; front linkage rods and rear linkage rods are provided between the front upper surrounding rod and the front lower surrounding rod, and between the rear upper surrounding rod and the rear lower surrounding rod, respectively;

when the upper surrounding frame is folded, the front supporting rods and the rear supporting rods are folded simultaneously as the upper surrounding frame, and the front lower surrounding rod is folded toward the front upper surrounding rod and the rear lower surrounding rod is folded toward the rear upper surrounding rod under the linkage action of the front linkage rods and the rear linkage rods, thereby completing the folding of the whole sleeping basket frame; and when the sleeping basket frame is folded, the sleeping plate is simultaneously folded with the lower surrounding frame.

2. The baby sleeping basket according to claim 1, wherein the lower portion of the front supporting rod and the lower portion of the rear supporting rod are bent respectively to form a front flat portion and a rear flat portion; when the sleeping basket frame is in the unfolded state, the front lower surrounding rod, the front flat portions of the front supporting rods, the rear flat portions of the rear supporting rods, and the rear lower surrounding rod are unfolded to form a lower surrounding frame of the sleeping basket frame and the lower surrounding frame is flat placed below the upper surrounding frame.

3. The folding baby sleeping basket according to claim 2, wherein a sleeping plate is arranged between bottom portions of the front lower surrounding rod and the rear lower surrounding rod, and the sleeping plate is provided with three folds arranged right and left corresponding to rotating connections of the front lower surrounding rod and the front supporting rods, rotating connections of the rear lower surrounding rod and the rear supporting rods, and rotating connections of the front supporting rods and the rear supporting rods, respectively; when the sleeping basket frame is folded, the sleeping plate is folded along the three folds.

4. The baby sleeping basket according to claim 1, further comprising insertion bases mounted at the rotating connections of the rear supporting rods and the rear lower surrounding rod.

5. The baby sleeping basket according to claim 3, wherein when the sleeping basket frame is in the unfolded state, rotation points between the front linkage rods and the front upper surrounding rod are located behind rotation connection points between the front supporting rods and the front upper surrounding rod, and rotation points between the front linkage rods and the front lower surrounding rod are located behind rotation connection points between the front supporting rods and the front lower surrounding rod; rotation points between the rear linkage rods and the rear upper surrounding rod are located before rotation connection points between the rear supporting rods and the rear upper surrounding rod, and rotation points between the rear linkage rods and the rear lower surrounding rod are located before rotation connection points between the rear supporting rods and the rear lower surrounding rod.

6. The folding baby sleeping basket according to claim 1, wherein the locking mechanisms are arranged at rotating connections of the front upper surrounding rod and the rear upper surrounding rod.

7. The baby sleeping basket according to claim 6, wherein the front or rear upper surrounding rod is provided with an unlocking operation assembly for simultaneously releasing the unfolding locking on the upper surrounding frame by the locking mechanisms on both sides.

* * * * *